United States Patent [19]

Hanson et al.

[11] Patent Number: 5,363,032
[45] Date of Patent: Nov. 8, 1994

[54] SENSORLESS START OF SYNCHRONOUS MACHINE

[75] Inventors: Michael J. Hanson, Loves Park; Gregory I. Rozman, Rockford, both of Ill.

[73] Assignee: Sundstrand Corporation, Rockford, Ill.

[21] Appl. No.: 61,168
[22] Filed: May 12, 1993
[51] Int. Cl.⁵ .............................. F02N 11/04
[52] U.S. Cl. .................... 322/10; 318/721; 318/701
[58] Field of Search ............ 322/10; 318/138, 254, 318/701, 720, 721, 723

[56] References Cited

U.S. PATENT DOCUMENTS

| | | | |
|---|---|---|---|
| 3,775,974 | 12/1973 | Silver | 60/39.34 |
| 3,902,073 | 8/1975 | Lafuze | 290/46 |
| 3,908,161 | 9/1975 | Messenger | 322/29 |
| 4,093,869 | 6/1978 | Hoffman et al. | 290/31 |
| 4,295,085 | 10/1981 | Lafuze | 318/721 |
| 4,354,126 | 10/1982 | Yates | 310/156 |
| 4,456,830 | 6/1984 | Cronin | 290/27 |
| 4,473,752 | 9/1984 | Cronin | 290/38 R |
| 4,684,081 | 8/1987 | Cronin | 244/58 |
| 4,687,961 | 8/1987 | Horber | 310/186 |
| 4,694,210 | 9/1987 | Elliott et al. | 310/68 R |
| 4,708,030 | 11/1987 | Cordner | 74/686 |
| 4,743,777 | 5/1988 | Shilling et al. | 290/46 |
| 4,754,220 | 6/1988 | Shimizu et al. | 324/208 |
| 4,772,802 | 9/1988 | Glennon et al. | 290/31 |
| 4,808,903 | 2/1989 | Matsui et al. | 318/800 |
| 4,841,216 | 6/1989 | Okada et al. | 322/10 |
| 4,868,406 | 9/1989 | Glennon et al. | 290/4 R |
| 4,900,231 | 2/1990 | Kennedy | 417/16 |
| 4,929,021 | 8/1990 | Rozman et al. | 318/254 |
| 4,933,623 | 6/1990 | Fox | 322/25 |
| 4,935,686 | 6/1990 | Stacey | 318/801 |
| 4,939,441 | 7/1990 | Dhyanchand | 318/718 |
| 4,942,493 | 7/1990 | Rozman et al. | 361/23 |
| 4,947,100 | 8/1990 | Dhyanchand et al. | 322/10 |
| 4,959,595 | 9/1990 | Nishimura | 318/138 |
| 4,967,334 | 10/1990 | Cook et al. | 363/34 |
| 4,968,926 | 11/1990 | Dhyanchand | 322/10 |
| 4,988,939 | 1/1991 | Reichard et al. | 318/800 |
| 4,992,721 | 2/1991 | Latos | 322/10 |
| 5,008,801 | 4/1991 | Glennon | 363/132 |
| 5,012,177 | 4/1991 | Dhyanchand et al. | 322/10 |
| 5,013,929 | 5/1991 | Dhyanchand | 290/31 |
| 5,015,927 | 5/1991 | Reichard | 318/139 |
| 5,015,941 | 5/1991 | Dhyanchand | 322/10 |
| 5,028,803 | 7/1991 | Reynolds | 290/31 |
| 5,040,366 | 8/1991 | Schulze | 60/39.08 |
| 5,051,670 | 9/1991 | De Piola | 318/434 |
| 5,051,680 | 9/1991 | Belanger | 318/701 |
| 5,055,700 | 10/1991 | Dhyanchand | 290/31 |
| 5,055,764 | 10/1991 | Rozman et al. | 322/10 |
| 5,068,590 | 11/1991 | Glennon et al. | 322/10 |
| 5,079,494 | 1/1992 | Reichard | 318/811 |
| 5,097,195 | 3/1992 | Raad et al. | 322/10 |
| 5,113,125 | 5/1992 | Stacey | 318/721 |
| 5,132,604 | 7/1992 | Shimane et al. | 322/10 |
| 5,140,245 | 8/1992 | Stacey | 318/723 |
| 5,189,353 | 2/1993 | Ezuka | 318/605 |

FOREIGN PATENT DOCUMENTS 2206751A 1/1989 United Kingdom.

OTHER PUBLICATIONS

E. Iizuka, et al., *IEEE Transactions on Industry Applications*, vol. 1A-21, No. 4, May/Jun. 1985.
Furuhashi, et al., *IEEE Transactions on Industrial Electronics*, vol. 39, No. 2, Apr. 1992.

*Primary Examiner*—Kristine L. Peckman
*Attorney, Agent, or Firm*—Marshall, O'Toole, Gerstein, Murray & Borun

[57] ABSTRACT

A synchronous generator usable in both a starting mode of operation and a generating mode of operation includes a permanent magnet generator having a permanent magnet and an armature winding rotatable with respect to the permanent magnet, an exciter portion having an exciter armature winding and an exciter field winding rotatable with respect to the exciter armature winding, and a main generator portion having a main generator armature winding and a main generator field winding rotatable with respect to the main generator armature winding. An inverter is coupled to supply power to the main generator portion armature winding via a DC link during the starting mode of operation, and an inverter controller includes a position sensing circuit that generates a rotor position signal based upon the differential reluctance between pairs of phase windings in the main generator portion armature winding.

27 Claims, 7 Drawing Sheets

| COUNT | STATE | T1 | T2 | T3 | T4 | T5 | T6 |
|---|---|---|---|---|---|---|---|
| 0 | ST1 | 1 | 0 | 0 | 0 | 0 | 1 |
| 1 | ST2 | 1 | 1 | 0 | 0 | 0 | 0 |
| 2 | ST3 | 0 | 1 | 1 | 0 | 0 | 0 |
| 3 | ST4 | 0 | 0 | 1 | 1 | 0 | 0 |
| 4 | ST5 | 0 | 0 | 0 | 1 | 1 | 0 |
| 5 | ST6 | 0 | 0 | 0 | 0 | 1 | 1 |

SENSORLESS START OF SYNCHRONOUS MACHINE

TECHNICAL FIELD

The present invention relates to the sensorless control of a synchronous machine during a starting mode of operation during which variable-frequency power is provided to the synchronous machine.

BACKGROUND ART

A synchronous machine operable in both starting modes and generating modes is disclosed in Glennon et al U.S. Pat. No. 5,068,590. The synchronous machine has a permanent magnet generator, an exciter and a main generator. In the generating mode, constant frequency AC power is generated by the synchronous machine from motive power provided by a prime mover, such as a jet engine. In the starting mode, the synchronous machine is accelerated by providing variable frequency electrical power to the main generator.

When a synchronous machine such as the one described above is operated in the starting mode, the frequency of the power provided to the armature winding of the main generator needs to be controlled in accordance with the relative position between the armature winding of the main generator and the field winding. Typically, some type of position sensor is used to detect the position of the synchronous machine rotor so that the variable frequency power is provided to the main generator armature winding at the appropriate intervals. For example, in Lafuze U.S. Pat. No. 3,902,073, three Hall effect sensors are used to determine the rotor position. Other types of sensors, such as resolvers or optical encoders, could be used to determine rotor position.

Rotor position may be determined without use of a sensor by detecting the back EMF generated in an unenergized phase winding of an armature winding of a synchronous machine. Since the magnitude of the back EMF is proportional to the rotational speed of the synchronous machine, being relatively low at low speed, it may be difficult to reliably start the synchronous machine when rotor position detection is based on back EMF. Detecting rotor position based on back EMF may be further complicated when the synchronous machine is started utilizing pulse-width modulated drive signals for current-limiting purposes.

SUMMARY OF THE INVENTION

The present invention is directed to a synchronous machine operable in a starting mode during which variable frequency power is provided to drive the synchronous machine to generate motive power. The synchronous machine includes an armature winding having three phase windings provided on a stator and a field winding provided on a rotor rotatable with respect to the stator. The synchronous machine can be operated in the starting mode, without the need for a rotor position sensor, by generating a rotor position signal based on the differential reluctance between pairs of the three phase windings.

During the starting mode, two of the three phase windings of the armature winding are energized at a time, leaving the third phase winding unenergized. The relative angular position between the armature winding and the field winding is determined by a position sensing circuit, based on the differential reluctance between pairs of the three phase windings, by comparing the voltage of the one unenergized phase winding with the voltage of the energized phase windings.

A signal relating to the magnitude of the voltage of the energized phase windings can be generated in a number of ways. It can be generated from the average voltage on the two energized phase windings; it can be generated from the voltage at the junction of the three phase windings where those windings are wye-connected; or, where power is provided to the armature winding via an inverter coupled to a DC link, it can be generated from one-half the DC link voltage provided to the inverter.

Based on the rotor position signal generated by the position sensing circuit, variable frequency power is provided to the armature winding to accelerate that winding with respect to the field winding, and thus to accelerate the rotor of the synchronous machine with respect to the stator.

In another aspect, the invention is directed to a synchronous machine in which a rotor position signal is generated based on inductance instead of differential reluctance. In this case, the rotor position signal is generated by subtracting the average voltage on the three windings of a wye-connected armature winding from the voltage at the junction of the armature winding.

DESCRIPTION OF THE PREFERRED EMBODIMENTS

Figure 1:
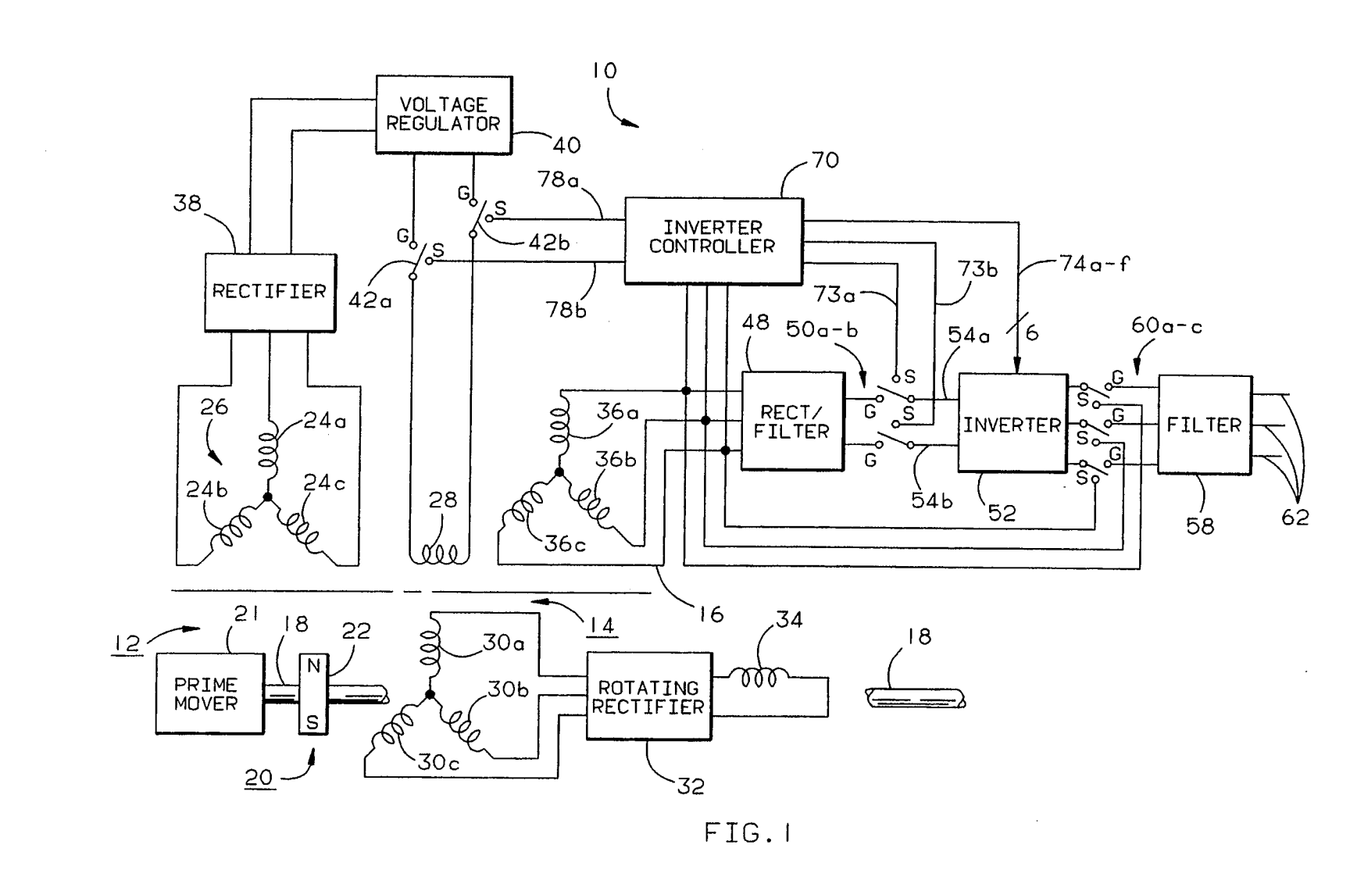
FIG. 1 is a diagram of a preferred embodiment of a synchronous machine in accordance with the present invention.

A preferred embodiment of the present invention, which is shown in FIG. 1, is a synchronous machine 10 having a permanent magnet generator (PMG) 12, an exciter portion 14 and a main generator portion 16. The synchronous machine 10 has a motive power shaft 18 connected to a rotor 20 attached to a prime mover 21, such as a gas turbine jet engine. The rotor 20 carries one or more permanent magnets 22 which form poles for the PMG 12. Rotation of the motive power shaft 18 causes relative movement between the magnetic flux produced by the permanent magnet 22 and a set of three-phase PMG armature windings including phase windings 24a–c mounted within a stator 26 of the generator 10.

The prime mover 21 and the generator 10 may comprise portions of an aircraft auxiliary power unit (APU) or any other power supply.

The exciter portion 14 includes a field winding 28 disposed in the stator 26 and a set of three-phase armature windings 30a-c disposed on the rotor 20, A set of rotating rectifiers 32 interconnect the exciter armature windings 30a-c and a main generator portion field winding 34 also disposed on the rotor 20 A set of three-phase, wye-connected main generator portion armature windings 36a-c are disposed in the stator 26.

The synchronous machine 10 may be operated in a generating mode, during which PMG armature windings 24a-c are coupled through a rectifier 38 and voltage regulator 40 to the exciter portion field winding 28 via a pair of contactors or mode switches 42a-b. As the prime mover 21 rotates the motive power shaft 18, power produced in the PMG armature windings 24a-c is rectified, regulated and delivered to the field winding 28. AC power is produced in the armature windings 30a-c, rectified by the rotating rectifiers 32 and applied to the main generator portion field winding 34. Rotation of the motive power shaft 18 and the field winding 34 induces three-phase AC voltages in the main generator portion armature windings 36a-c. Those three-phase voltages are provided to a rectifier/filter 48 that generates a DC voltage and provides that voltage to a main inverter 52 via a DC link 54 and a pair of mode switches 50a-b. The main inverter 52 generates three-phase, constant-frequency AC power which is provided to a filter 58 via three mode switches 60a-c. After the three-phase AC power is filtered, it is provided to a load bus 62 for distribution.

The main inverter 52 includes six controllable transistor power switches which, during the generate mode, are switched at a constant rate so that the DC power generated on the DC link 54 by the main generator portion armature windings 36a-c is converted to constant-frequency AC power and provided to the load bus 62.

During the starting mode, the switches 60a-c are positioned to connect main inverter 52 to supply variable-frequency power to the armature windings 36a-c via three lines 64a-c to accelerate the rotor 20 with respect to the stator 26. The main inverter 52 generates that variable-frequency power from a voltage provided across the DC link 54, which voltage is generated by an inverter controller 70 and provided to the DC link 54 via mode switches 50a-b and lines 73a-b. The inverter controller 70 also generates six drive signals that are provided to the six power switches of the main inverter 52 via lines 74a-f to accelerate the rotor 20 with respect to the stator 26. The inverter controller 70 may also be connected to supply power to the exciter field winding 28 via a pair of lines 78a-b and the switches 42a-b during the starting mode.

Figure 2:
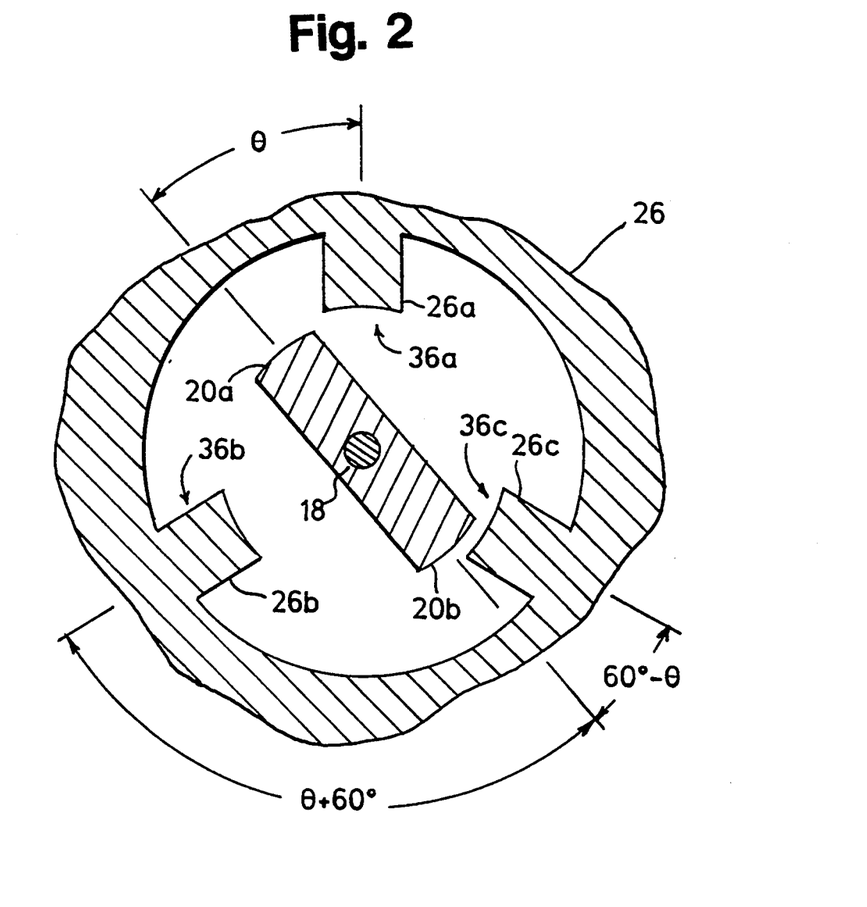
FIG. 2 is a cross-section of a stator and a rotor of a synchronous machine.

Referring to FIG. 2, a cross section of a portion of a simplified one-pole version of the stator 26 and the rotor 20 are shown. The stator 26 has three phase windings 36a-c which comprise a central member 26a-c about which the wire coils (not shown) are formed. Typically, the stator 26 would have more poles.

The rotor 20 has a first end 20a and a second end 20b. As shown in FIG. 2, the first rotor end 20a is aligned at an angle $\theta$ with respect to the phase winding 36a; the second rotor end 20b is aligned at an angle $\theta+60°$ with respect to the second phase winding 36b; and the second rotor end 20b is aligned at an angle $60°-\theta$ with respect to the third phase winding 36c.

The reluctance, or magnetic path length, between various pairs of the three phase windings 36a-c varies as a function of rotor position in accordance with the following equations:

$$R_{ac} = K_1 + K_2 \cos \theta \cos (60° - \theta), \quad [1]$$

$$R_{ab} = K_1 + K_2 \cos \theta \cos (\theta + 60°), \quad [2]$$

where $R_{ac}$ is the reluctance between the phase windings 36a, 36c, where $R_{ab}$ is the reluctance between the phase windings 36a, 36b, $K_1$ is a first constant, $K_2$ is a second constant, and $\theta$ is the angle defined in FIG. 2.

The differential reluctance between various pairs of the three phase windings 36a-36c also varies as a function of rotor position. The differential reluctance is the difference between the reluctance between a first pair of windings and a second pair of windings. For example, the differential reluctance between phase windings 36b, 36c, referred to herein as $R_{b-c}$, is the difference between $R_{ab}-R_{ac}$. It should be appreciated that the differential reluctance $R_{b-c}$ is zero when the rotor 20 is vertically aligned in FIG. 2. From equations [1] and [2] above, the differential reluctance $R_{b-c}$ is as follows:

$$R_{b-c} = R_{ab} - R_{ac} \quad [3]$$

$$R_{b-c} = K_1 + K_2 \cos \theta \cos (\theta + 60°) - K_1 - K_2 \cos \theta \cos (60° \theta) \quad [4]$$

$$R_{b-c} = K_2 [\cos \theta \cos (\theta + 60°) - \cos \theta \cos (60° - \theta)] \quad [5]$$

Equation [5] above can be further simplified to show that the differential reluctance $R_{b-c}$ is proportional to sin $2\theta$. The differential reluctances $R_{a-c}$ and $R_{a-b}$ can be shown to be proportional to sin $2(\theta - 60°)$ and sin $2(\theta + 60°)$, respectively.

Figure 3A:
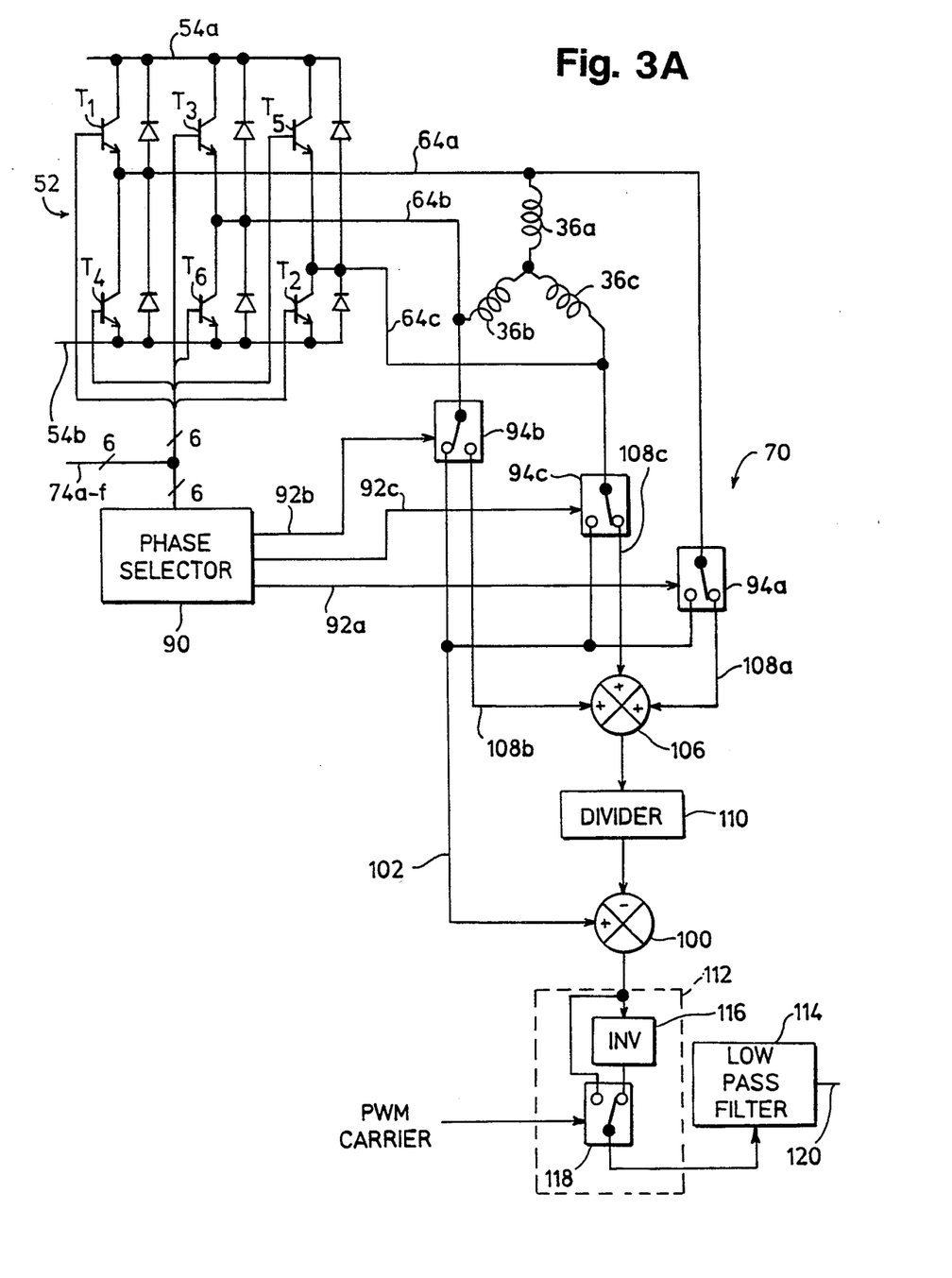
FIG. 3A is a diagram of the inverter, the main generator portion armature phase windings, and a portion of the inverter controller of FIG. 1.

FIG. 3A illustrates the main inverter 52 when it is connected to the phase windings 36a-c by the switches 60a-c (not shown in FIG. 3A) during the starting mode and a portion of the inverter controller 70 which generates a rotor position signal based on the differential reluctance between successively selected pairs of phase windings 36a-36c. The inverter 52 includes six controllable transistor power switches $T_1$ through $T_6$ and six flyback diodes connected in a bridge configuration. The actuation of the power switches $T_1-T_6$ is controlled by the drive signals provided via the lines 74a-f, which signals are shown as waveforms WT1 through WT6 in FIG. 4. The positive portions of the waveforms WT1-WT6 may be pulse-width modulated (not shown) by a PWM carrier signal having a much higher frequency than that of the waveforms WT1-WT6.

The inverter controller 70 includes a phase selector 90 which also receives the six drive signals WT1-WT6 on the lines 74a-f and generates therefrom three switch actuator signals on three lines 92a-c which are used to selectively activate three switches 94a-c, each of which has an input connected to one of the phase windings 36a-c. Each of the switches 94a-c has a first output, shown at the bottom left portion of each switch, which is connected to the noninverting input of a summing amplifier 100 via a line 102. Each of the switches 94a-c has a second output, shown at the bottom right portion of each switch, which is connected to one of three noninverting inputs of a summing amplifier 106 via one of three lines 108a-c.

Figure 4:
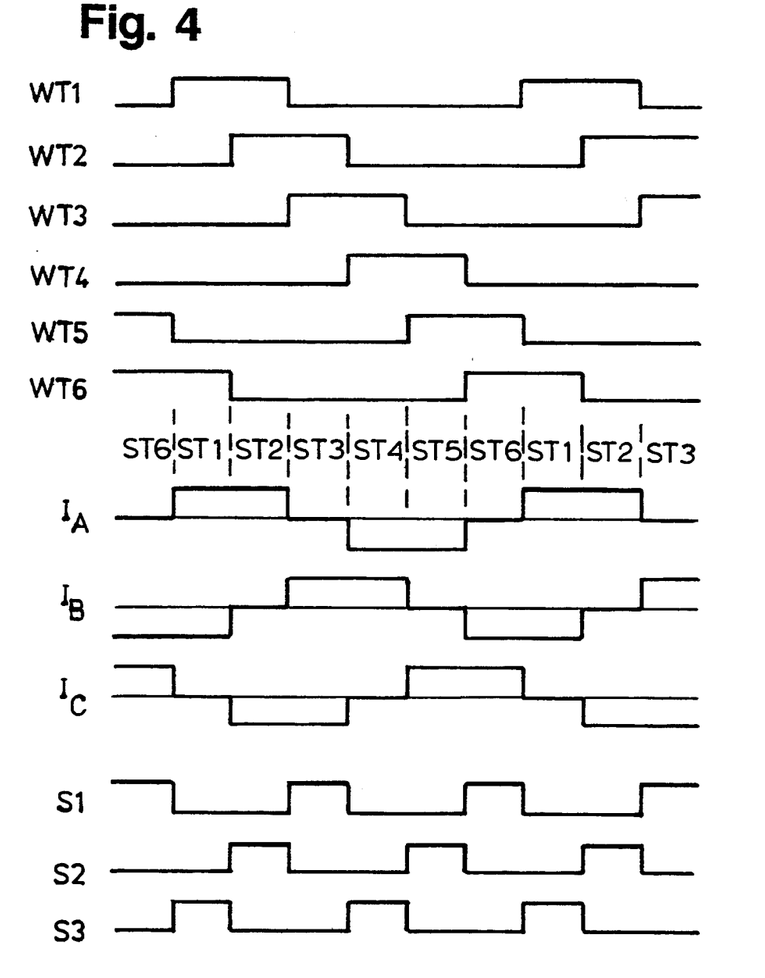
FIG. 4 illustrates a number of signals generated during the operation of the synchronous machine.

At any given time during the starting mode of operation, there is current flowing through exactly two of the three phase windings 36a–c, with the third phase winding having no current passing therethrough, or being "unenergized." The currents passing through the phase windings 36a–c are shown represented as $I_A$, $I_B$, $I_C$, respectively, in FIG. 4.

The phase selector 90 generates the switch actuator signals on the lines 92a–c so that the voltage generated on the unenergized phase winding, which is generated as a result of transformer coupling to the energized phase windings, is provided to the noninverting input of the summing amplifier 100. That is accomplished by causing the switch 94 connected to the unenergized phase winding to connect its input to the output shown at the bottom left portion of the switch.

If the phase winding to which a switch 94 is connected is energized, the switch input is connected to the output shown at the bottom right portion of the switch, so that the voltages on the two energized phase windings are provided to two of the noninverting inputs of the summing amplifier 106.

The switch positions as shown in FIG. 3A would occur when the phase winding 36b was unenergized and the phase windings 36a, 36c were energized. The switch actuator signals generated by the phase selector 90 on the lines 92a–c are designated S1–S3, respectively, in FIG. 4 and are shown with respect to the waveforms WT1–WT6 from which they are generated. The switch actuator signal S1 has a high value when neither waveform WT1 nor WT4 has a high value; the signal S2 has a high value when neither waveform WT3 nor WT6 has a high value; and the signal S3 has a high value when neither waveform WT2 nor WT5 has a high value.

In operation during the starting mode, two of the three windings 36a–c are energized, leaving the third winding unenergized. The switches 94a–c are repeatedly switched, as described above, so that the voltage on the unenergized winding is always provided to the noninverting input of the summing amplifier 100 via the line 102 and the voltages on the energized phase windings are always provided to the summing amplifier 106. The amplifier 106 sums the voltages of the two energized windings, and the sum is provided to a divider 110 which divides the sum by the number of energized phase voltages used to generate the voltage sum, which in this case is two, to generate an average phase voltage signal.

The voltage on the unenergized phase winding will have a relatively large DC component and a relatively small AC component with a phase or envelope representative of rotor position. For example, if the voltage difference between the lines 54a and 54b is 270 volts, the DC component of the unenergized phase voltage would be approximately 135 volts, and the average of the voltages of the two energized phase windings would be approximately 135 volts. The relatively small AC component of the unenergized phase voltage might be one volt peak-to-peak.

In order to extract the small AC component of the unenergized phase voltage, which contains the information regarding the angular position of the rotor 20 with respect to the stator 26, the average phase voltage signal generated by the divider 110 is provided to the inverting input of the summing amplifier 100, where it is subtracted from the unenergized phase voltage, resulting in the AC component of the unenergized phase voltage which is representative of rotor position.

The positive portions of the pulses of waveforms WT1–WT6 shown in FIG. 4 may be pulse-width modulated (not shown) by a carrier signal having a much higher frequency than the waveforms WT1–WT6. As a result, the rotor position signal generated by the summing amplifier 100 will have a frequency and phase the same as the PWM carrier frequency, but the magnitude, or envelope, of the signal will vary at a much lower frequency with a phase which is representative of rotor position.

To extract the lower frequency envelope from the rotor position signal, the output of the summing amplifier 100 is provided to a synchronous demodulator circuit comprising a multiplier 112 and a low pass filter 114. The multiplier 112 comprises an inverter 116 and a two-input switch 118. A first input of the switch 118 is connected to receive the rotor position signal from the amplifier 100, and a second output of the switch 118 is connected to receive an inverted rotor position signal from the inverter 116. The switch 118 is switched at the frequency of the PWM carrier signal to alternately provide at its output the uninverted and inverted rotor position signal. This particular multiplier circuit 112 is used in the case of a square-wave PWM carrier signal. Other types of multiplier circuits and synchronous demodulator circuits could also be used.

Figure 3B:
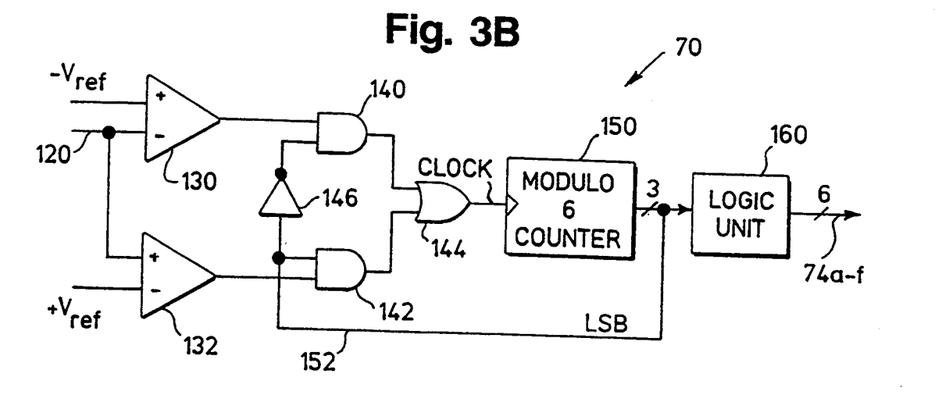
FIG. 3B is a diagram of a second portion of the inverter controller of FIG. 1.

The demodulated rotor position signal is generated on a line 120 and provided to a portion of the inverter controller 70, shown in FIG. 3B, which converts the rotor position signal into a clock signal and generates from that clock signal the six drive signals WT1–WT6 for controlling the transistor power switches $T_1$–$T_6$ of the main inverter 52.

Referring to FIG. 3B, the rotor position signal on the line 120 is provided to the negative input of a first comparator 130 and the positive input of a second comparator 132. The first comparator 130 determines when the magnitude of the rotor position signal is more negative than a predetermined negative voltage, $-V_{ref}$, and the second comparator 132 determines when the magnitude of the rotor position signal is greater than a predetermined positive voltage, $+V_{ref}$.

The clock signal is generated from the output of the comparators 130, 132 by a 1-of-2 data selector comprising a pair of AND gates 140, 142, an OR gate 144, and an inverter 146. A first binary data select signal is provided to the AND gate 142 via a line 152 and a second binary data select signal is provided to the AND gate 140 via the inverter 146 connected to the line 152. The data select signals, which at all times are complemented with respect to each other, are generated from the least-significant bit (LSB) of a counter 150 so that the data select signals values switch each time the count of the counter increases by one.

Figure 5:
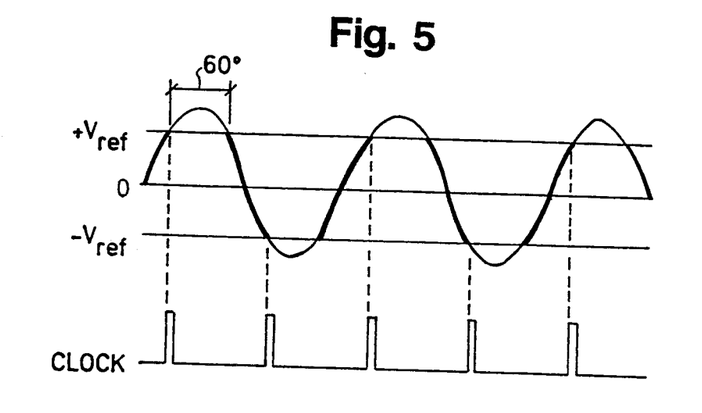
FIG. 5 illustrates a number of signals generated in the inverter controller portion of FIG. 3B.

The rotor position signal, the $+V_{ref}$ and $-V_{ref}$ signals, and the clock signal generated by the OR gate 144 are shown in FIG. 5. The rising edge of each pulse of the clock signal is triggered alternately by the magnitude of the rotor position signal reaching the predetermined $+V_{ref}$ and $-V_{ref}$ signals. The rising edge of each clock pulse triggers the counter 150 to increase the count, causing the binary value of the least-significant bit to change and the magnitudes of the data select signals to switch. As a result, the AND gate 140 or 142 that generated the high binary value (when either the $+V_{ref}$ or $-V_{ref}$ magnitude was exceeded) is no longer selected, and the clock signal magnitude falls to zero shortly after each rising edge.

The actual shape of the rotor position signal generated on the line 120 would approximate the waveform produced by horizontally compressing the bold portions of the sinusoidal signal, which fall between the $+V_{ref}$ and $-V_{ref}$ thresholds, so that they were joined together. The actual shape would thus approximate a triangular waveform. The magnitude of the actual rotor position signal does not substantially exceed the $+V_{ref}$ and $-V_{ref}$ thresholds because, when the rotor position signal reaches each threshold, the drive signals on the lines 74a-f cause the rotor 20 to be advanced 60 electrical degrees shortly thereafter. The magnitudes of the $+V_{ref}$ and $-V_{ref}$ thresholds should be selected so that the horizontal "spacing" between the bold portions of the rotor position signal corresponds to 60 electrical degrees, as shown in FIG. 5. The magnitudes of the $+V_{ref}$ and $-V_{ref}$ thresholds may be selected to be a predetermined percentage of the voltage across the DC link 54a-b, the percentage being based upon generator parameters.

Figure 6:
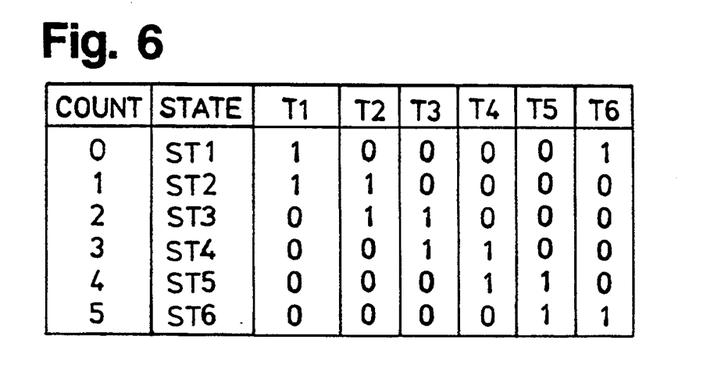
FIG. 6 illustrates a table specifying the output signals generated by the logic unit of FIG. 3B.

The counter 150 is a modulo-six counter having a three-bit binary output. The output of the counter 150 is provided to a logic unit 160 which generates the six transistor drive signals WT1-WT6 in accordance with the counter output in accordance with the table shown in FIG. 6.

When the synchronous machine is initially started, the counter 150 can be initialized with one of six initial counts so that one set of drive signals is generated on the lines 74a-f. If the counter 150 does not increment within a predetermined period of time, meaning that the initial set of drive signals did not cause any torque to be produced on the rotor 20, the counter 150 can be loaded with another one of the six initial counts until the correct count is loaded. The loading of the initial counts could be performed by a digital signal processor coupled to the counter 150.

The 1-of-2 selector, the counter 150, the logic unit 160, and/or other features of the described embodiment could be implemented with a digital signal processor executing a computer program.

Figure 7:
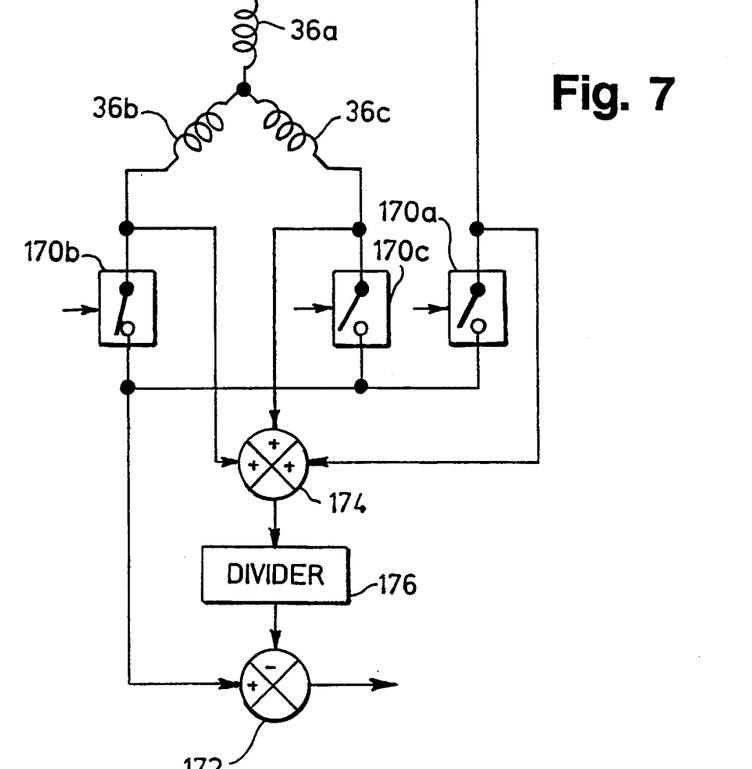
FIG. 7 is a diagram of a portion of a first alternative embodiment of the invention.

A portion of a first alternative embodiment is shown in FIG. 7. In this embodiment, the phase windings 36a-c are connected to three switches 170a-c, respectively, each of which has a single output connected to the noninverting input of a summing amplifier 172. The switches 170a-c are switched such that the unenergized phase winding is connected to the noninverting input of the summing amplifier 172. Each of the phase windings 36a-c is also connected to a respective noninverting input of a summing amplifier 174, which generates a signal representing the sum of the phase winding voltages. The phase voltage sum is provided to a divider 176, which divides the phase voltage sum by three to generate a signal representing the average phase voltage. The average phase voltage is provided to the inverting input of the amplifier 172 whereby that voltage is subtracted from the voltage at the unenergized phase winding. The output of the summing amplifier 172 would be provided to the multiplier circuit 112 of FIG. 3A.

Figure 8:
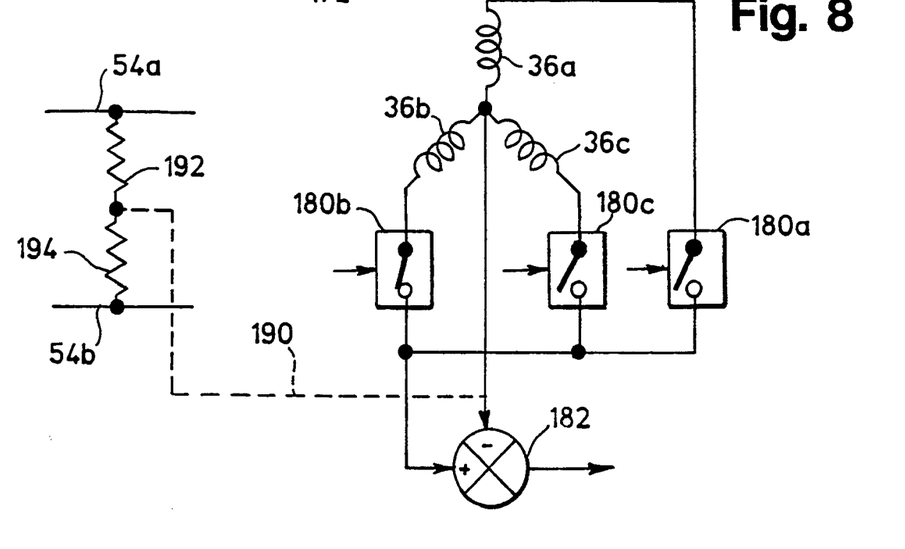
FIG. 8 is a diagram of a portion of a second alternative embodiment of the invention.

A portion of a second alternative embodiment is shown in FIG. 8. In this embodiment, the phase windings 36a-c are connected to three switches 180a-c, respectively, which are switched so that the unenergized phase winding is connected to the noninverting input of a summing amplifier 182. The junction of the phase windings 36a-c is connected to the inverting input of the amplifier 182 so that the voltage at the junction of the windings is subtracted from the voltage at the unenergized phase winding. The output of the summing amplifier 182 would be provided to the multiplier circuit 112 of FIG. 3A.

As a further alternative, shown in the left-hand portion of FIG. 8, instead of connecting the inverting input of the amplifier 182 to the junction of the phase windings 36a-c, the inverting input could be coupled via a dotted line 190, to the junction of a pair of identical resistors 192, 194 provided across the DC link 54a-b so that the inverting input of amplifier 182 would receive a signal representing one-half the voltage across the DC link 54a-b.

Figure 9:
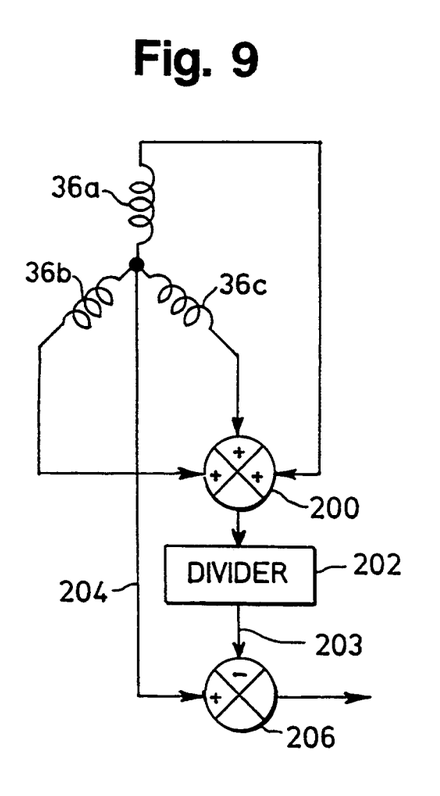
FIG. 9 is a diagram of a portion of a third alternative embodiment of the invention.

A portion of a further alternative embodiment is illustrated in FIG. 9. In the embodiment of FIG. 9, rotor position is detected based on inductance sensing instead of differential reluctance sensing. Referring to FIG. 9, the voltages on all three phase windings 36a-c are provided to a summing amplifier 200, which generates a signal representing the voltage sum. The voltage sum signal is provided to a divider 202, which divides the voltage sum signal by three to generate an average phase voltage signal on a line 203. The voltage at the junction of the wye-connected windings 36a-c is provided via a line 204 to the noninverting input of a summing amplifier 206. The summing amplifier 206 generates a rotor position signal by subtracting the average phase voltage signal on the line 203 from the junction voltage on the line 204. In the embodiment of FIG. 9, the average phase voltage signal on the line 203 could be generated in other ways. For example, it could be generated by dividing the sum of the voltages on the energized phase windings by two, or it could be generated by dividing the DC link voltage by two.

Although the invention has been described in connection with a synchronous machine operable in both starting and generating modes, the invention could also be utilized in other embodiments, such as electromechanical actuators and pumps. Instead of the field winding 28 on the rotor 20, another means of generating a magnetic field could be used, such as a permanent magnet on the rotor 20.

The above manner of sensing rotor position could be used for only a portion of the time during the starting mode of operation. For example, the above method could be used during the initial portion of the starting mode when the rotor 20 is at relatively low speed, and a method of detecting rotor position based on back EMF could be used for the latter portion of the starting mode when the rotor 20 is at relatively high speed. In this case, sensing rotor position based on back EMF could be used, for example, when the magnitude of the back EMF reaches a predetermined threshold and/or when the rotor reaches a predetermined rotational speed.

Numerous additional modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A synchronous machine operable in a starting mode during which variable frequency power is provided to drive the synchronous machine to generate motive power, said synchronous machine comprising:
   means for generating a magnetic field;
   an armature winding having a first phase winding, a second phase winding and a third phase winding, said armature winding being rotatable with respect to said field generating means;
   means coupled to said armature winding for energizing two of said first, second and third phase windings while leaving one of said first, second and third phase windings unenergized, each of said phase windings having a voltage associated therewith;
   means for generating an average voltage representing the sum of the voltages on the energized phase windings divided by the number of energized phase windings;
   means for determining the relative position between said field generating means and said armature winding by comparing the voltage of said one unenergized phase winding with the average voltage of said two energized phase windings; and
   means for providing said variable frequency power to said armature winding based upon the relative position of said field generating means and said armature winding as determined by said position determining means.

2. A synchronous machine as defined in claim 1 wherein said field generating means comprises a field winding.

3. A synchronous machine as defined in claim 1 wherein said power providing means comprises an inverter.

4. A synchronous machine as defined in claim 1 wherein said position determining means comprises:
   a switching circuit coupled to said armature winding;
   a summing amplifier coupled to said switching circuit; and
   a phase selector coupled to said switching circuit.

5. A synchronous machine as defined in claim 4 wherein said position determining means additionally comprises a synchronous demodulator.

6. A synchronous machine as defined in claim 5 wherein said power providing means comprises an inverter and wherein said position determining means additionally comprises means coupled to said inverter for generating a plurality of inverter drive signals.

7. A synchronous machine as defined in claim 1 wherein said power providing means comprises an inverter and wherein said position determining means comprises:
   a first switch coupled to said first phase winding;
   a second switch coupled to said second phase winding;
   a third switch coupled to said third phase winding;
   a phase selector coupled to said inverter and said first, second and third switches; and
   an amplifier circuit coupled to said first, second and third switches.

8. A synchronous machine as defined in claim 7 wherein said amplifier circuit comprises:
   a first summing amplifier coupled to said first, second and third switches that generates a first summing signal;
   a divider connected to receive said first summing signal from said first summing amplifier; and
   a second summing amplifier coupled to said divider and to one of said first, second and third switches.

9. A synchronous machine as defined in claim 7 wherein said position determining means additionally comprises a demodulator coupled to said amplifier circuit.

10. A synchronous machine as defined in claim 1 wherein said means for energizing said phase windings comprises an inverter coupled to a DC link having a DC link voltage.

11. A synchronous machine operable in a starting mode during which variable frequency power is provided to drive the synchronous machine to generate motive power, said synchronous machine comprising:
    means for generating a magnetic field;
    an armature winding having a first phase winding, a second phase winding and a third phase winding connected in wye fashion at a common junction, said armature winding being rotatable with respect to said field generating means;
    means coupled to said armature winding for energizing two of said first, second and third phase windings while leaving one of said first, second and third phase windings unenergized, each of said first, second and third phase windings and said common junction having a voltage thereon;
    means for determining the relative position between said field generating means and said armature winding by comparing the voltage of said one unenergized phase winding with the voltage at said common junction of said wye-connected first, second and third phase windings; and
    means for providing said variable frequency power to said armature winding based upon the relative position of field generating means and said armature winding as determined by said position determining means.

12. A synchronous machine operable in a starting mode during which variable frequency power is provided to drive the synchronous machine to generate motive power and in a generating mode in which the synchronous machine converts motive power to electrical power, said synchronous machine comprising:
    a permanent magnet generator having a permanent magnet and an armature winding rotatable with respect to said permanent magnet;
    an exciter portion having an exciter armature winding and an exciter field winding rotatable with respect to said exciter armature winding;
    a main generator portion field winding;
    a main generator portion armature winding having a first phase winding, a second phase winding and a third phase winding,
    each of said first, second and third phase windings having a reluctance associated therewith, and a voltage thereon, said main generator portion armature winding being rotatable with respect to said main generator portion field winding;
    a position sensing circuit coupled to said main generator portion armature winding, said position sensing circuit generating a position signal based upon a differential reluctance between pairs of said first, second and third phase windings during the starting mode of operation;
    a synchronous demodulator coupled to said position sensing circuit that demodulates said position signal based on a carrier signal to generate a demodulated position signal during the starting mode of operation; and an inverter coupled to the main generator portion armature winding, said inverter supplying said variable-frequency power to said main generator portion armature winding during the starting mode of operation based on said demodulated position signal generated by said synchronous demodulator, said variable frequency power being modulated by said carrier signal.

13. A synchronous machine as defined in claim 12 wherein said position sensing circuit comprises:

a phase selector circuit that generates a phase select signal;

a switching circuit coupled to selectively sense the voltages on said main generator portion armature winding; and a summing circuit coupled to said switching circuit and generating a summing signal based on said voltages sensed by said switching circuit.

14. A synchronous machine as defined in claim 12 including means for generating first, second and third voltage signals representing the voltages on said first, second and third phase windings, respectively, and wherein two of said first, second and third phase windings are energized at a time while leaving one of said first, second and third phase windings unenergized, and wherein said position sensing circuit comprises:

a phase selector circuit coupled to said inverter, said phase selector circuit generating first, second and third switching signals;

a switching circuit coupled to said phase selector circuit, said switching circuit having first, second and third switches coupled to receive said first, second and third switching signals generated by said phase selector circuit and said first, second and third voltage signals, from said first, second and third phase windings;

a first summing amplifier connected to said first, second and third switches; and a second summing amplifier connected to said first second and third switches, said first, second and third switches being controlled by said first, second and third switching signals, respectively such that said first summing amplifier receives the two of said first, second and third voltage signals that corresponds to said two energized windings and said second summing amplifier receives the one of sad first, second and third voltage signals that corresponds to said one unenergized winding.

15. A synchronous machine as defined in claim 12 additionally comprising an inverter driver circuit including:

means for generating first and second reference signals;

a first comparator that compares the magnitude of said position signal with said first reference signal;

a second comparator that compares the magnitude of said position signal with said second reference signal; and a data selector coupled to said first and said second comparators.

16. A synchronous machine as defined in claim 15 wherein said inverter driver circuit additionally comprises a counter coupled to said data selector.

17. A synchronous machine operable in a starting mode during which variable frequency power is provided to drive the synchronous machine to generate motive power, said synchronous machine comprising:

a permanent magnet generator having a permanent magnet and an armature winding rotatable with respect to said permanent magnet;

an exciter portion having an exciter armature winding and an exciter field winding rotatable with respect to said exciter armature winding;

a main generator portion having a main generator armature winding with first, second and third phase windings and a main generator field winding rotatable with respect to said main generator armature winding, at least one of said first, second and third phase windings being energized at a time while leaving one of said first, second and third phase windings unenergized, each of said first, second and third phase windings having a voltage associated therewith;

a position sensing circuit coupled to said main generator portion armature winding, said position sensing circuit generating a position signal with a magnitude related to the relative angular position between said main generator armature winding and said main generator field winding, said relative angular position being based on the voltage on said unenergized phase winding;

a synchronous demodulator that demodulates said position signal to generate a demodulated position signal; and an inverter coupled to said main generator portion armature winding that supplies said variable frequency power to said main generator portion armature winding based on said position signal generated by said position sensing circuit, said variable frequency power being modulated by a carrier signal.

18. A method of starting a synchronous machine having an armature winding with first, second and third phase windings which meet at a junction, each of said first, second and third phase windings and said junction having a voltage thereon, a magnetic field generator rotatable with respect to said armature winding, and an inverter for selectively energizing said first, second and third phase windings in accordance with drive signals provided to said inverter, said method comprising the steps of:

(a) energizing two of said first, second and third phase windings by applying voltage thereto while leaving one of said first, second and third phase windings unenergized;

(b) generating a first signal relating to the magnitude of the voltage on said unenergized phase winding;

(c) generating a second signal relating to the magnitude of the voltage on said energized phase windings;

(d) generating a position signal based on the difference between said first and second signals;

(e) generating a plurality of drive signals based on the magnitude of said position signal and transmitting said drive signals to the inverter; and (f) continuously repeating said steps of energizing, first signal generating, second signal generating, position signal generating, and drive signal generating a plurality of times in order to accelerate the magnetic field generator with respect to the armature winding.

19. A method as defined in claim 18 wherein said second signal generating step comprises generating said second signal as representing an average voltage on said energized phase windings.

20. A method as defined in claim 19 including determining said average voltage on said energized phase windings by summing the voltages on said energized phase windings.

21. A method as defined in claim 18 wherein said second signal generating step comprises generating said second signal as representing the voltage at the junction of said first, second and third phase windings.

22. A method as defined in claim 18 wherein the second signal generating step comprises generating said second signal as representing one-half a DC link voltage provided to the inverter.

23. A method of starting a synchronous machine having an armature winding with first, second and third phase windings, each of said phase windings having a voltage associated therewith, a magnetic field generator rotatable with respect to said armature winding, and an inverter for selectively energizing said first, second and third phase windings in accordance with drive signals provided to said inverter, said method comprising the steps of:

(a) energizing two of said first, second and third phase windings by applying voltage thereto while leaving one of said first, second and third phase windings unenergized, said voltage applied to said two energized phase windings being modulated in accordance with a carrier signal;

(b) generating a first signal relating to the magnitude of the voltage on said unenergized phase winding;

(c) generating a second signal relating to the magnitude of the voltage on said energized phase windings;

(d) generating a position signal based on the difference between said first and second signals, said position signal being synchronously demodulated in accordance with said carrier signal;

(e) generating a plurality of drive signals based on the magnitude of said position signal and transmitting said drive signals to the inverter; and (f) continuously repeating said steps continuously repeating said steps of energizing, first signal generating, second signal generating, position signal generating, and drive signal generating a plurality of times in order to accelerate the magnetic field generator with respect to the armature winding.

24. A method of starting a synchronous machine having an armature winding with first, second and third phase windings which meet at a junction, each of said first, second and third phase windings and said junction having a voltage thereon, a magnetic field generator rotatable with respect to said armature winding, and an inverter for selectively energizing said first, second and third phase windings in accordance with drive signals provided to said inverter, said method comprising the steps of:

(a) energizing two of said first, second and third phase windings by applying voltage thereto while leaving one of said first, second and third phase windings unenergized;

(b) generating a first signal relating to the magnitude of the voltage at the junction of said first, second and third phase windings;

(c) generating a second signal relating to the magnitude of the average voltage on said first, second and third phase windings;

(d) generating a position signal based on the difference between said first and second signals;

(e) generating a plurality of drive signals based on the magnitude of said position signal and transmitting said drive signals to the inverter; and (f) continuously repeating said steps of energizing, first signal generating, second signal generating, position signal generating, and drive signal generating a plurality of times in order to accelerate the magnetic field generator with respect to the armature winding.

25. A method as defined in claim 24 wherein said second signal generating step comprises generating said second signal as representing an average voltage on said energized phase windings.

26. A method as defined in claim 25 including determining said average voltage on said energized windings by summing the voltages on said energized windings.

27. A method as defined in claim 24 additionally comprising the steps of:

(g) modulating the voltage applied to the first, second and third phase windings during said energizing step in accordance with a carrier signal; and (h) synchronously demodulating said position signal in accordance with said carrier signal.

* * * * *